United States Patent
Wiers

(10) Patent No.: US 11,117,533 B1
(45) Date of Patent: Sep. 14, 2021

(54) EMERGENCY POWER DEVICE FOR ELECTRIC VEHICLES

(71) Applicant: Steve Wiers, Land O Lakes, FL (US)

(72) Inventor: Steve Wiers, Land O Lakes, FL (US)

( * ) Notice: Subject to any disclaimer, the term of this patent is extended or adjusted under 35 U.S.C. 154(b) by 549 days.

(21) Appl. No.: 16/056,638

(22) Filed: Aug. 7, 2018

(51) Int. Cl.
| H02J 7/00 | (2006.01) |
| H02J 7/14 | (2006.01) |
| B60R 16/033 | (2006.01) |
| B60L 50/60 | (2019.01) |
| H02J 7/35 | (2006.01) |
| H02J 7/02 | (2016.01) |

(52) U.S. Cl.
CPC ............ B60R 16/033 (2013.01); B60L 50/66 (2019.02); H02J 7/0021 (2013.01); H02J 7/35 (2013.01); H02J 7/022 (2013.01)

(58) Field of Classification Search
USPC .................................................. 320/137, 126
See application file for complete search history.

(56) References Cited

U.S. PATENT DOCUMENTS

| 4,009,051 | A | 2/1977 | Kazis | |
| 7,508,163 | B2 * | 3/2009 | Batts-Gowins | H02J 7/342 320/105 |
| 7,835,534 | B2 * | 11/2010 | Cole, Jr. | A45C 15/00 381/189 |
| 7,884,502 | B2 | 2/2011 | Lyman | |
| D642,513 | S | 8/2011 | Chen | |
| 8,203,237 | B1 * | 6/2012 | Cowles | H02S 20/30 307/150 |
| 9,099,892 | B2 | 8/2015 | Jakins | |
| 9,490,659 | B1 * | 11/2016 | English | H02J 7/007 |
| 2008/0297106 | A1 * | 12/2008 | Toya | H02J 7/35 320/107 |
| 2009/0038673 | A1 | 2/2009 | Ware | |
| 2009/0096399 | A1 * | 4/2009 | Chen | H01M 10/44 318/441 |
| 2013/0257346 | A1 * | 10/2013 | Jakins | H02J 7/35 320/107 |
| 2017/0179726 | A1 * | 6/2017 | Garrity | H02J 7/0045 |
| 2020/0044478 | A1 * | 2/2020 | Tally | F21V 33/008 |

FOREIGN PATENT DOCUMENTS

| CA | 1065014 | 10/1979 | |
| EP | 2512002 A2 * | 10/2012 | H02J 7/0027 |

* cited by examiner

Primary Examiner — Alexis B Pacheco
(74) Attorney, Agent, or Firm — Kyle A. Fletcher, Esq.

(57) ABSTRACT

The emergency power device for electric vehicles is an electrochemical device. The emergency power device for electric vehicles stores chemical potential energy that readily converts into electricity for use with an electric vehicle. The emergency power device for electric vehicles forms a power reserve used to recharge a device selected from the group consisting of: a) an electric vehicle; b) a personal data device; and, c) the combination of the electric vehicle and the personal data device. The emergency power device for electric vehicles independently replenishes the stored chemical potential energy after consumption. By independent is meant that the emergency power device for electric vehicles does not require an electrical connection to an externally provided energy source such as the national electric grid. The emergency power device for electric vehicles comprises a power circuit and a housing. The housing contains the power circuit.

18 Claims, 7 Drawing Sheets

EMERGENCY POWER DEVICE FOR ELECTRIC VEHICLES

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of transportation and vehicles, more specifically, an electric circuit for a vehicle not otherwise provided for. (B60R16/033)

SUMMARY OF INVENTION

The emergency power device for electric vehicles is an electrochemical device. The emergency power device for electric vehicles stores chemical potential energy that readily converts into electricity for use with an electric vehicle. The emergency power device for electric vehicles forms a power reserve used to recharge a device selected from the group consisting of: a) an electric vehicle; b) a personal data device; and, c) the combination of the electric vehicle and the personal data device. The emergency power device for electric energy after consumption. By independent is meant that the emergency power device for electric vehicles does not require an electrical connection to an externally provided energy source such as the national electric grid. The emergency power device for electric vehicles comprises a power circuit and a housing. The housing contains the power circuit. The housing is a triangular prism structure.

These together with additional objects, features and advantages of the emergency power device for electric vehicles will be readily apparent to those of ordinary skill in the art upon reading the following detailed description of the presently preferred, but nonetheless illustrative, embodiments when taken in conjunction with the accompanying drawings.

In this respect, before explaining the current embodiments of the emergency power device for electric vehicles in detail, it is to be understood that the emergency power device for electric vehicles is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the emergency power device for electric It is therefore important that the claims be regarded as including such equivalent construction insofar as they do not depart from the spirit and scope of the emergency power device for electric vehicles. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
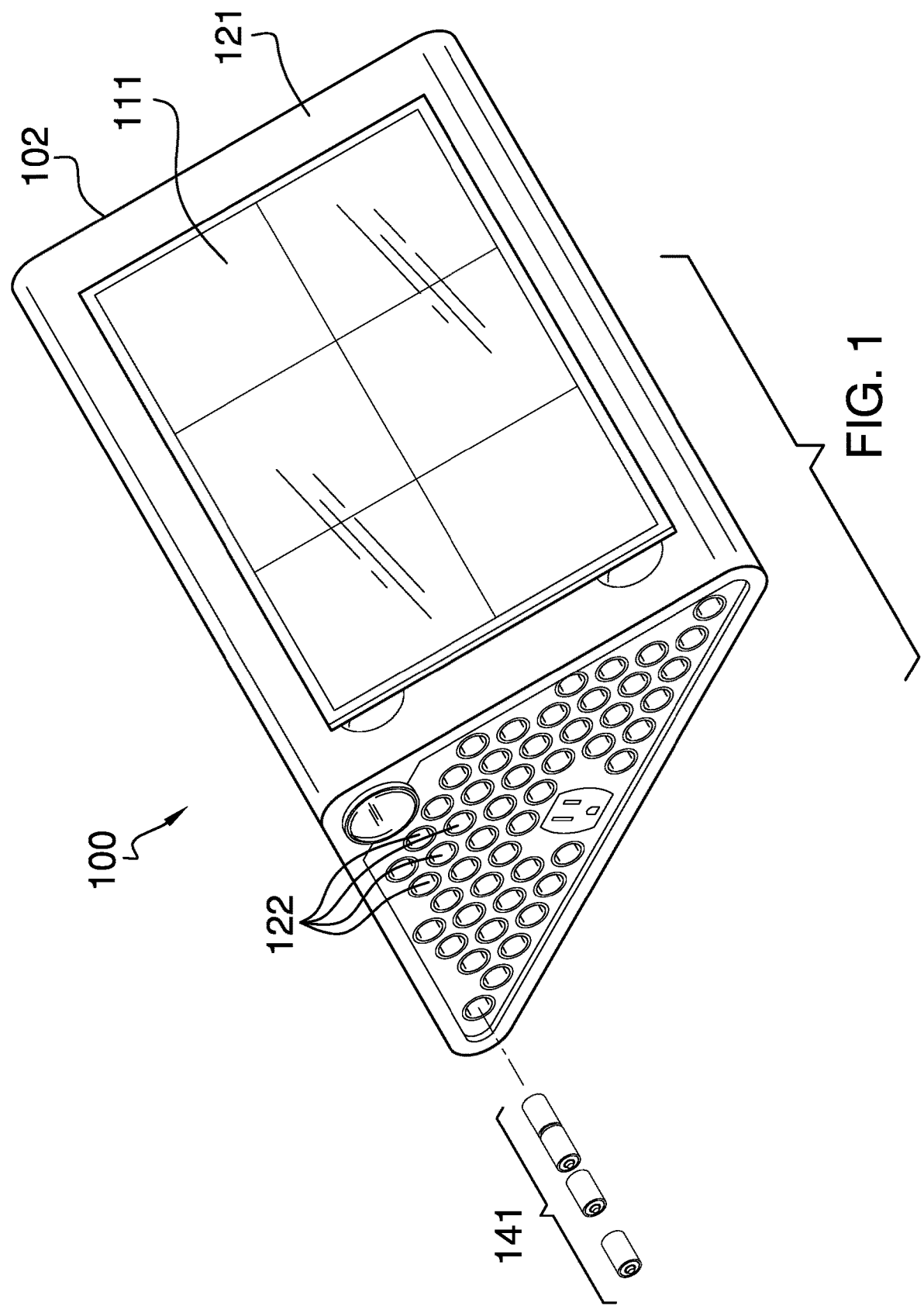
FIG. 1 is a perspective view of an embodiment of the disclosure.
Figure 2:
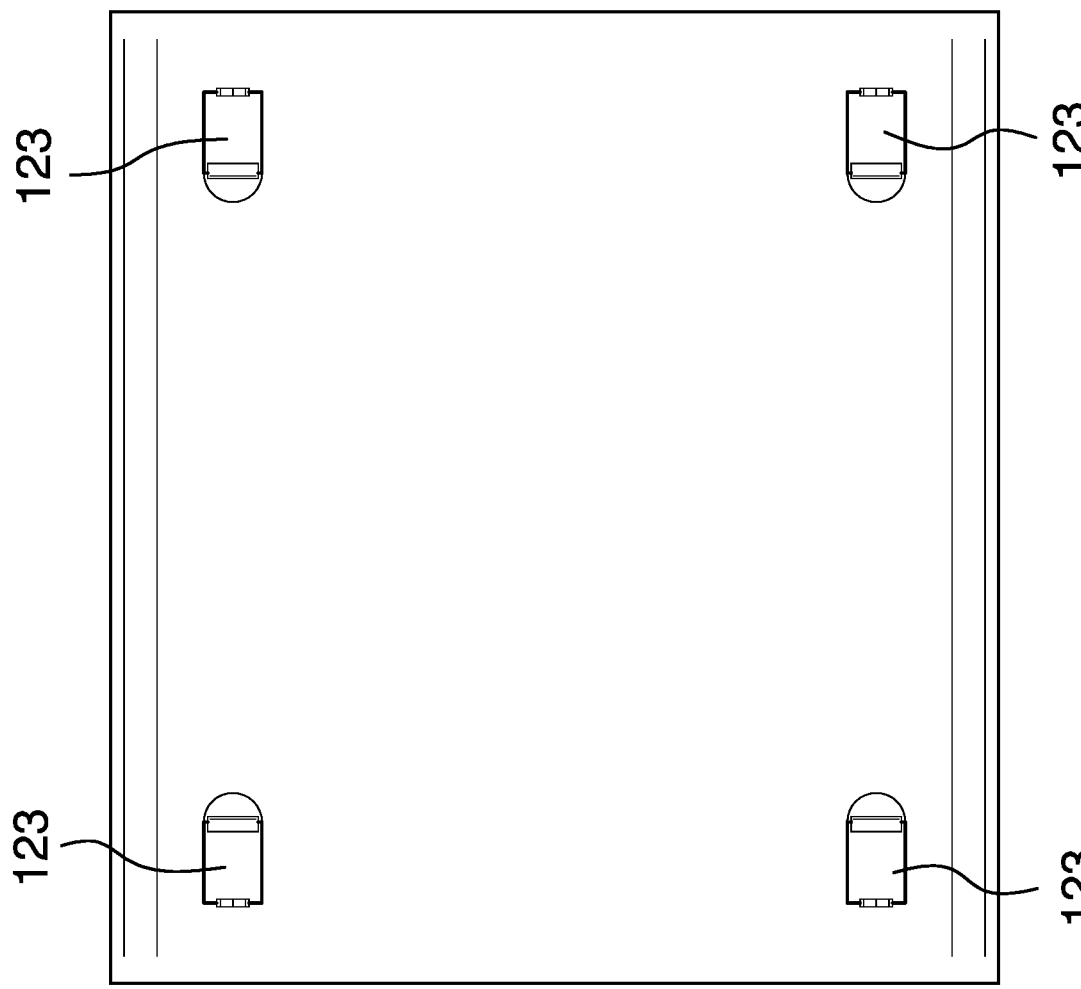
FIG. 2 is a bottom view of an embodiment of the disclosure.
Figure 3:
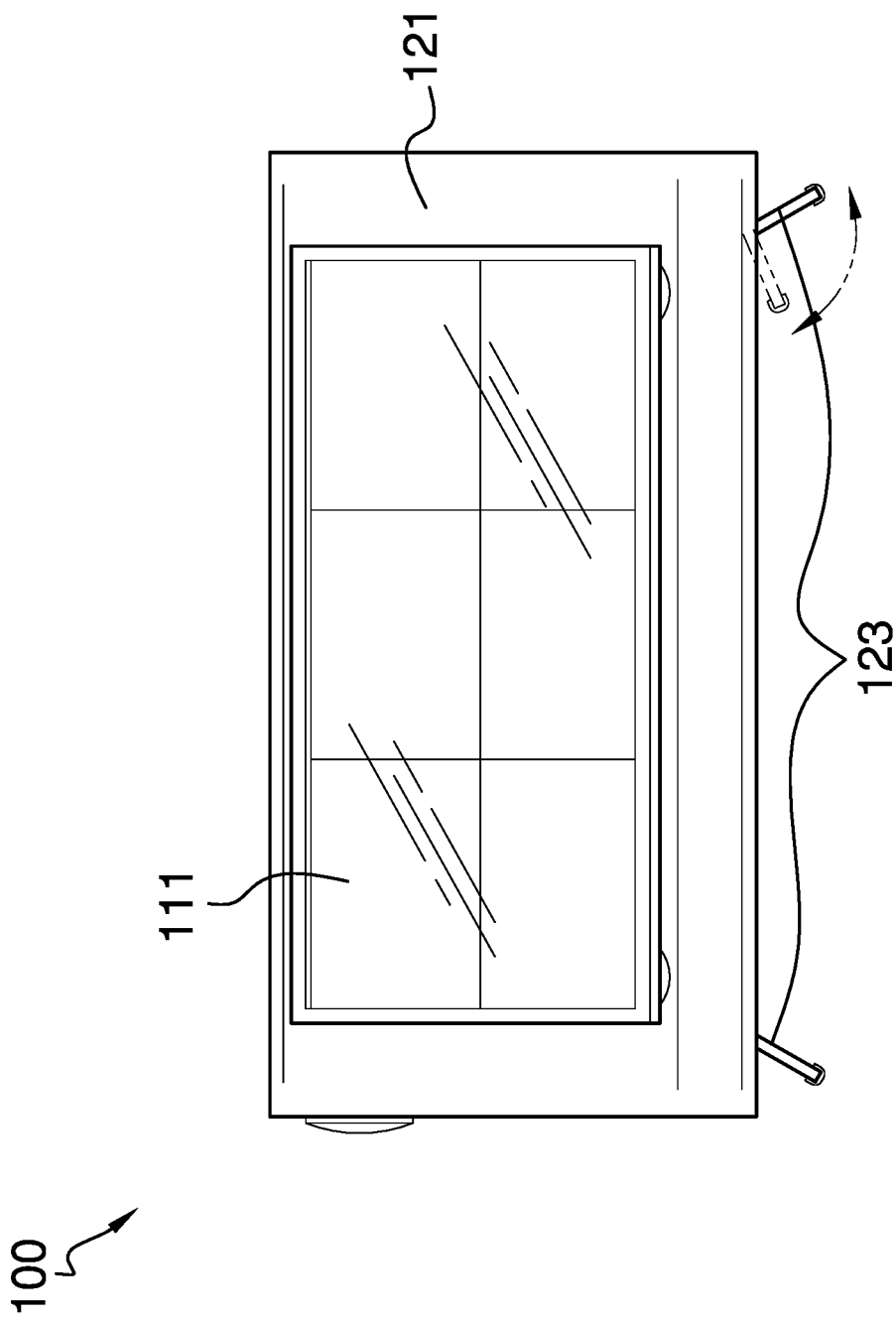
FIG. 3 is a side view of an embodiment of the disclosure.
Figure 4:
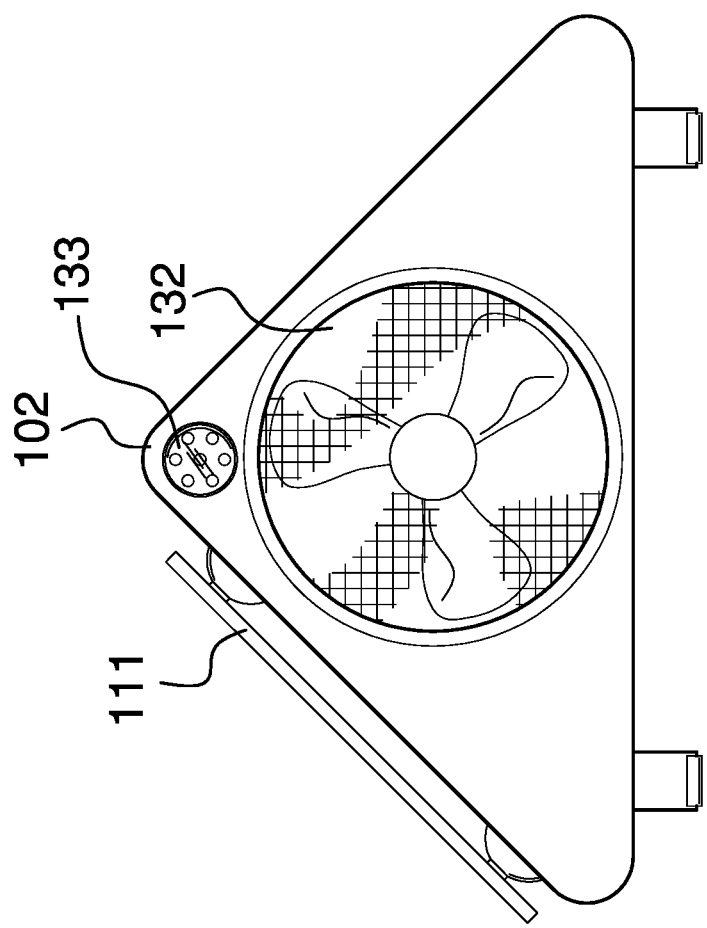
FIG. 4 is a front view of an embodiment of the disclosure.
Figure 5:
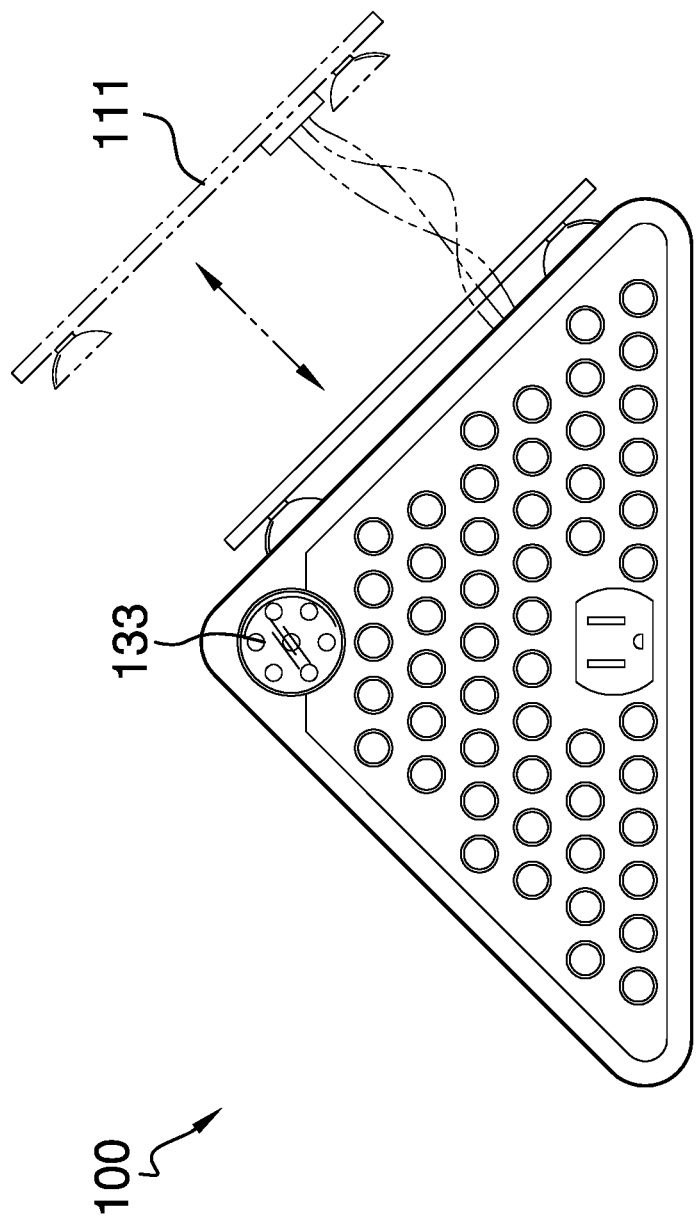
Figure 6:
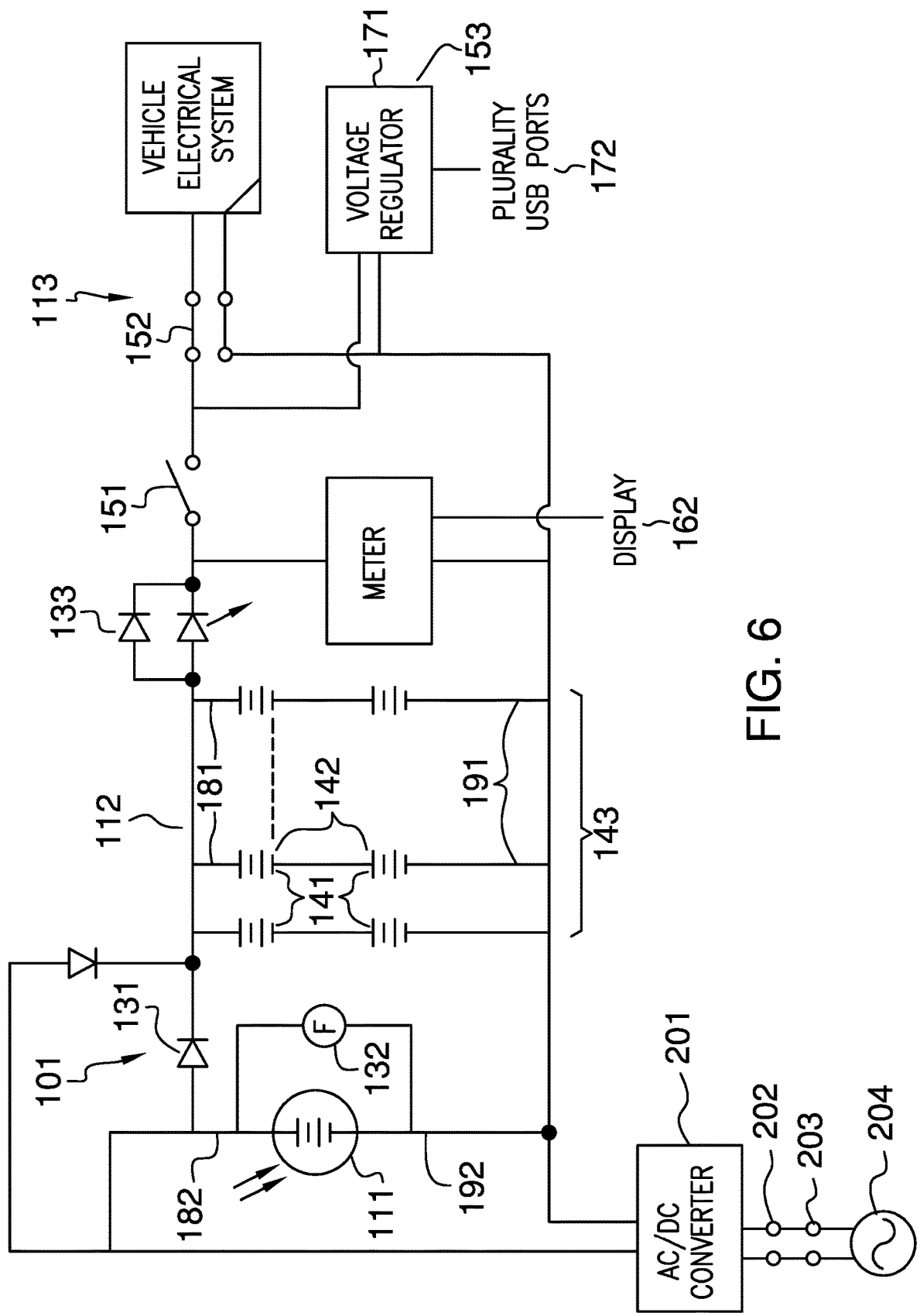
FIG. 6 is a block diagram or schematic view of an embodiment of the disclosure.
Figure 7:
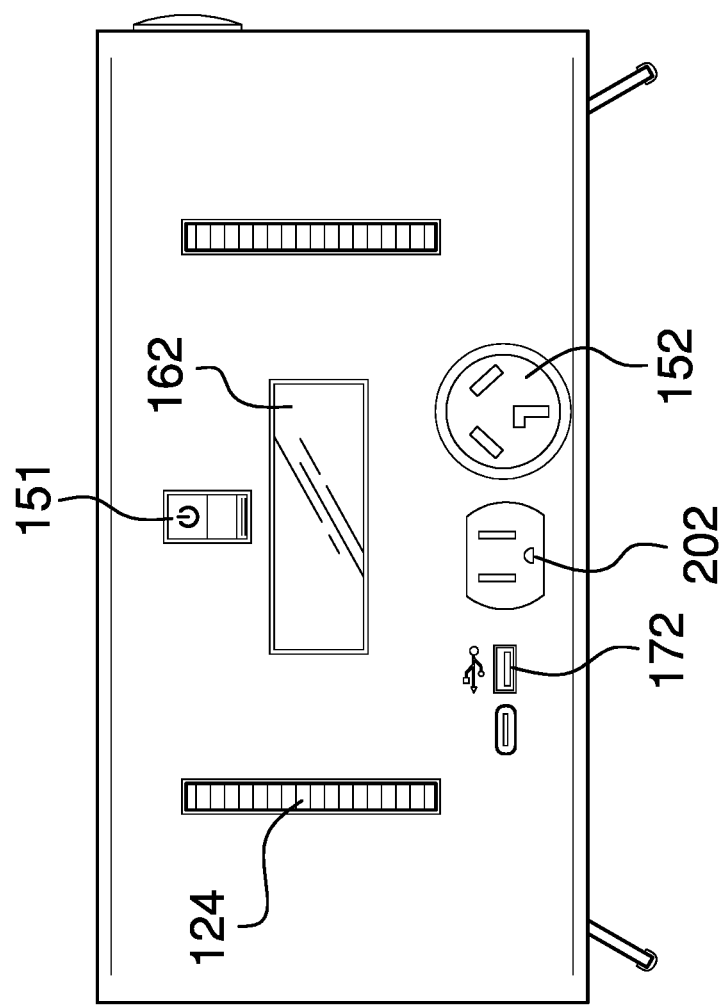
FIG. 7 is a reverse side view of an embodiment of the disclosure.

Detailed reference will now be made to one or more potential embodiments of the disclosure, which are illustrated in FIGS. 1 through 7.

The emergency power device for electric vehicles 100 invention 100 stores chemical potential energy readily converts into electricity for use with an electric vehicle. The invention 100 forms a power reserve used to recharge a device selected from the group consisting of: a) an electric vehicle; b) a personal data device; and, c) the combination of the electric vehicle and the personal data device. The invention 100 independently replenishes the stored chemical potential energy after consumption. By independent is meant that the invention 100 does not require an electrical connection to an externally provided energy source such as the national electric grid 204. The invention 100 comprises a power circuit 101 and a housing 102. The housing 102 contains the power circuit 101. The housing 102 is a triangular prism structure.

The housing 102 is a casing. The housing 102 contains the power circuit 101. The housing 102 is formed with all apertures and form factors necessary to allow the housing 102 to accommodate the use and operation of the power circuit 101. The housing 102 is a triangular prism structure. The housing 102 has the shape of an equilateral triangle. Methods to form a housing 102 suitable for the purposes described in this disclosure are well-known and documented in the mechanical arts. The housing 102 comprises a shell 121, a plurality of battery vents 124. The shell 121 forms the rigid exterior surfaces of the housing 102.

The shell 121 forms the shape of a triangular prism. Each of the plurality of battery chambers 122 is a cylindrical negative space formed within the interior of the shell 121. The plurality of battery chambers 122 are described in greater detail elsewhere in this disclosure.

Each of the plurality of footings 123 is a footing. The plurality of footings 123 mount on the lateral face of the shell 121. The plurality of footings 123 mount on the region of the lateral face of the shell 121 that is proximal to the supporting surface that receives the shell 121. Each of the plurality of footings 123 are hinged structures such that any selected footing can rotate relative to the lateral face of the shell 121.

Each of the plurality of vents 124 is an aperture formed through the lateral face of the shell 121. The plurality of vents 124 are positioned on the same region of the shell 121 as the plurality of footings 123.

The power circuit 101 is a battery powered electric circuit. The power circuit 101 stores chemical potential energy. The power circuit 101 converts the stored chemical potential energy into electrical energy. The power circuit 101 group consisting of an electric vehicle and a personal data device. The power circuit 101 converts light into electrical energy that is used to recharge the chemical potential energy for future use. The power circuit 101 further monitors the stored chemical potential energy that is available for immediate conversion into electrical energy. The power circuit 101 comprises a plurality of photovoltaic cells 111, a battery circuit 112, and a power distribution circuit 113. The plurality of photovoltaic cells 111 is further defined with a second positive terminal 182 and a second negative terminal 192.

The plurality of photovoltaic cells 111 is a bank of individual photovoltaic cells. The plurality of photovoltaic cells 111 removably attach to the lateral face of the shell 121 such that the plurality of photovoltaic cells 111 have access to sunlight. In the first potential embodiment of the disclosure, a plurality of suction cups are used to attach to the lateral face of the shell 121. Each of the plurality of photovoltaic cells 111 directly converts light, including light from the sun, into electrical energy. Each of the plurality of photovoltaic cells 111 are electrically connected to form a bank. The plurality of photovoltaic cells 111 feeds the generated electrical energy into the battery circuit 112 in order to battery circuit 112. The plurality of photovoltaic cells 111 further comprises a diode 131 and a fan 132.

In the first potential embodiment of the disclosure, a plurality of suction cups are used to attach the plurality of photovoltaic cells 111 to the lateral face of the shell 121. The suction cup is an apparatus that creates a partial vacuum relative to the atmosphere between the surface of the suction cup and lateral face of the shell 121. This pressure differential between the partial vacuum and the atmospheric pressure provides the force necessary to secure the plurality of photovoltaic cells 111 to the lateral face of the shell 121.

The fan 132 is a mechanical device. The fan 132 pumps air through the shell 121 to cool the battery circuit 112 during recharging of the chemical potential energy. The fan 132 is configured to operate whenever the plurality of photovoltaic cells 111 are generating electrical energy. The plurality of vents 124 provides an air intake and an air exhaust for the airflow generated by the fan 132. The fan 132 mounts on an end of the prism structure of the shell 121.

The diode 131 is discussed elsewhere in this disclosure.

The battery circuit 112 is a chemical device. The battery circuit 112 stores the chemical potential energy that is subsequently used to generate the electrical energy used to electric vehicle and a personal data device. The battery circuit 112 further comprises a plurality of individual battery cells 141, a plurality of series circuits 142, and a plurality of parallel circuits 143. The plurality of parallel circuits 143 is further defined with a first positive terminal 181 and a first negative terminal 191.

Each of the plurality of individual battery cells 141 is a chemical device. Each of the plurality of individual battery cells 141 are identical. The plurality of individual battery cells 141 stores chemical potential energy that is subsequently released as electrical energy. The process that generates the chemical potential energy is reversible such that each of the plurality of individual battery cells 141 is rechargeable.

A subset of individual batteries selected from the plurality of individual battery cells 141 are electrically connected to form a series circuit selected from the plurality of series circuits 142. The subset of individual batteries electrically connect in series such that the voltage across the series circuit associated with the subset of individual batteries equals the sum of the voltage across each individual battery contained within the subset of individual batteries. Each individual battery contained within the plurality of individual battery cells 141 is assigned to a series circuit of individual batteries contained within each series circuit selected from the plurality of series circuits 142 is identical.

Each of the plurality of battery chambers 122 contains a series circuit selected from the plurality of series circuits 142. There is a one to one correspondence between the plurality of battery chambers 122 and the plurality of series circuits 142.

Each of the plurality of series circuits 142 are electrically connected in parallel to form the plurality of parallel circuits 143. The use of the plurality of parallel circuits 143 allows the plurality of series circuits 142 to provide a greater amount of electric current for any given voltage provided by each of the plurality of series circuits 142.

The battery circuit 112 is a rechargeable battery circuit 112. The chemical energy stored within the battery circuit 112 is renewed and restored through the use of the plurality of photovoltaic cells 111. The plurality of photovoltaic cells 111 is an electrical circuit that reverses the polarity of the battery circuit 112 and provides the energy necessary to reverse the chemical processes that the battery circuit 112 initially used to generate the electrical energy. This reversal of the chemical process creates a chemical potential energy that will later be used by the battery circuit 112 to generate electricity.

The diode 131 is an electrical device that allows current to flow in only one direction. The diode 131 installs between the battery circuit 112 and the plurality of photovoltaic cells 111 such that electricity will not flow from the first positive terminal 181 of the battery circuit 112 into the second positive terminal 182 of the plurality of photovoltaic cells 111.

The plurality of parallel circuits 143 further comprises a meter 161 and a display 162. The meter 161 is an electrical instrument. The meter 161 electrically connects in parallel across the plurality of parallel circuits 143. The meter 161 monitors the level of chemical potential energy contained within the plurality of parallel circuits 143. The meter 161 indicates the measured level of chemical potential energy on the display 162.

The power distribution circuit 113 is an electric circuit. The power distribution circuit 113 transports the electrical energy generated from the chemical potential energy to the device selected from the group consisting of an electric vehicle and a personal data device. The power distribution circuit 113 further comprises a master switch 151, an EV cable 152, and an auxiliary power distribution 153.

The master switch 151 is an electrical switch. The master switch 151 forms a series circuit between the battery circuit 112 and the power distribution circuit 113 such that the master switch 151 controls the flow of electric current into the power distribution circuit 113. In the first potential embodiment of the disclosure, the master switch 151 is a maintained switch.

The EV cable 152 is an electric cable that transfers electrical energy from the battery circuit 112 to the power system of an electric vehicle. The EV cable 152 is a commercially available product.

The auxiliary power distribution 153 is an electrical circuit. The auxiliary power distribution 153 draws electrical energy from the battery circuit 112 such that the drawn electrical energy can power one or more personal data devices. The auxiliary power distribution 153 further comprises a voltage regulator 171 and a plurality of incidental ports 172.

The voltage regulator 171 is an electrical circuit. The voltage regulator 171 is a circuit that changes the voltage provided by the plurality of parallel circuits 143 into an output voltage suitable for use by a personal data device. The design and use of a voltage regulator 171 for this purpose are well-known and documented in the electrical arts. Each of the plurality of incidental ports 172 is a port that is designed to receive a plug provisioned with a personal data device. Each of the plurality of incidental ports 172 distributes electrical energy to the personal data device through a port selected from the plurality of incidental ports 172. In the first potential embodiment of the disclosure, each of the plurality of incidental ports 172 is a USB port.

In a second potential embodiment of the disclosure, the battery circuit 112 further comprises a plurality of LEDs 133. One or more LEDs selected from the plurality of LEDs 133 are mounted on each end of the prism-shaped structure of the shell 121 such that the plurality of LEDs 133 are visible when illuminated. As shown most clearly in FIG. 6, the plurality of LEDs 133 electrically connect within the battery circuit 112 such that the plurality of LEDs 133 illuminate when an electric current is drawn out of the battery circuit 112.

In a third potential embodiment of the disclosure, the ability to draw electrical energy from the national electric grid 204 is incorporated into the invention 100. In this scenario, it is assumed that the national electric grid 204 is accessed through a NEMA 5-15P electrical socket 202 and a NEMA 5-15P electrical plug 203. In this scenario, a commercially available AC/DC converter 202 electrically connects to the national electric grid 204 using the NEMA 5-15P electrical socket 202 and the NEMA 5-15P electrical plug 203. Methods to connect an electrical device to the national electric grid 204 in this manner are well-known and documented in the electrical arts. The AC/DC converter 202 is contained within the shell 121. As shown most clearly in FIG. 6, the AC/DC converter 202 electrically connects to the battery circuit 112 such that the AC/DC converter reverses the polarity of the plurality of individual battery cells 141 within the battery circuit 112. This configuration allows the battery circuit to be recharged from the national electric grid 204.

The following definitions were used in this disclosure:

AC: As used in this disclosure, AC is an acronym for alternating current.

AC/DC Converter: As used in this disclosure, an AC/DC converter is an electrical device that converts an AC voltage into a regulated DC voltage by rectifying and regulating the AC voltage. Method to design and build AC/DC converters are well known in the electrical arts. The AC/DC converter is further defined with a positive terminal, a negative terminal and a power input.

Anodes and Cathodes: As used in this disclosure, an anode and a cathode are the connecting terminals of an electrical circuit element or device. Technically, the cathode is the terminal through which the physical electrons flow into the device. The anode is the terminal through which the physical electrons flow out of the device. As a practical matter the anode refers to: 1) the positive terminal of a power consuming electrical circuit element; 2) the negative terminal of a discharging battery or an electrical power source; and, 3) the positive terminal of a charging battery. As a further practical matter the cathode refers to: 1) the negative terminal of a power consuming electrical circuit element; 2) the positive terminal of a discharging battery or an electrical power source; and, 3) the negative terminal of a charging battery.

Battery: As used in this disclosure, a battery is a chemical device consisting of one or more cells, in which chemical energy is converted into electricity and used as a source of power. Batteries are commonly defined with a positive terminal and a negative terminal.

Cable: As used in this disclosure, a cable is a collection of insulated wires covered by a protective casing used for transmitting electricity or telecommunication signals.

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or a prism. The center axis of a prism is the line that joins the center point of the first congruent face of the prism to the center point of the second corresponding congruent face of the prism. The center axis of a pyramid refers to a line formed through the apex of the pyramid that is perpendicular to the base of the pyramid. When the center axes of two cylinder, prism or pyramidal structures share the same line they are said to be aligned. When the center axes of two cylinder, prism or pyramidal structures do not share the same line they are said to be offset.

DC: As used in this disclosure, DC is an acronym for direct current.

Diode: As used in this disclosure, a diode is a two terminal semiconductor device that allows current flow in only one direction. The two terminals are called the anode and the cathode. Electric current is allowed to pass from the anode to the cathode.

Electric Motor: In this disclosure, an electric motor is a machine that converts electric energy into rotational mechanical energy. An electric motor typically comprises a stator and a rotor. The stator is a stationary hollow cylindrical structure that forms a magnetic field. The rotor is a magnetically active rotating cylindrical structure that is coaxially mounted in the stator. The magnetic interactions between the rotor and the stator physically causes the rotor to rotate within the stator thereby generating rotational mechanical energy. This disclosure assumes that the power source is an externally provided source of DC electrical power. The use of DC power is not critical and AC power can be used by exchanging the DC electric motor with an AC motor that has a reversible starter winding.

Electric Vehicle: As used in this disclosure, an electric vehicle is a vehicle that uses an electric motor for propulsion. EV is a common abbreviation for an electric vehicle.

External Power Source: As used in this disclosure, an external power source is a source of the energy that is externally provided to enable the operation of the present disclosure. Examples of external power sources include, but are not limited to, electrical power sources and compressed air sources.

Fan: As used in this disclosure, a fan is a pump that moves a gas. The first potential embodiment of this disclosure assumes that the fan is a mechanical device with rotating blades used to create a flow or current of air.

Footing: As used in this disclosure, a footing refers to one of a plurality of small pedestals that combine to: a) raise an object above a supporting surface; and, b) transfer the load path of the object to the supporting surface.

Form Factor: As used in this disclosure, the term form factor refers to the size and shape of an object.

Hinge: As used in this disclosure, a hinge is a device that permits the turning, rotating, or pivoting of a first object relative to a second object.

Housing: As used in this disclosure, a housing is a rigid casing that encloses and protects one or more devices.

Load: As used in this disclosure, the term load refers to an object upon which a force is acting or which is otherwise absorbing energy in some fashion. Examples of a load in this sense include, but are not limited to, a mass that is being moved a distance or an electrical circuit element that draws energy. The term load is also commonly used to refer to the forces that are applied to a stationary structure.

Load Path: As used in this disclosure, a load path refers to a chain of one or more structures that transfers a load generated by a raised structure or object to a foundation, supporting surface, or the earth.

Maintained Switch: A used in this disclosure, a maintained switch is a switch that maintains the position that was set in the most recent switch actuation. A maintained switch works in an opposite manner to a momentary switch.

National Electric Grid: As used in this disclosure, the national electric grid is a synchronized and highly interconnected electrical network that distributes energy in the form of electric power from a plurality of generating stations to consumers of electricity.

Negative Space: As used in this disclosure, negative space is a method of defining an object through the use of open or empty space as the definition of the object itself, or, through the use of open or empty space to describe the boundaries of an object.

NEMA: As used in this disclosure, NEMA is an acronym for National Electric Manufacturers Association. NEMA is a manufacturer's association known for publishing widely accepted technical standards regarding the performance of electrical power distribution equipment.

NEMA 5-15 Electrical Socket: As used in this disclosure, the NEMA 5-15 electrical socket is a port designed to provide electric power drawn from the National Electric Grid. The NEMA 5-15 electrical socket is commonly used to deliver electrical power to electric devices in residential, office, and light industrial settings. The typical NEMA5-15 electrical socket comprises a plurality of electric ports from which electric power is drawn. The position of each of the plurality of electric ports is placed in a standardized position. The typical NEMA5-15 electrical socket further comprises a plate hole which is a standardized hole located in a standardized position within the NEMA 5-15 electrical socket that that is designed to receive a bolt that is used to attach a faceplate to the NEMA 5-15 electrical socket. The NEMA 5-15 electrical socket is also commonly referred to as an electrical outlet.

NEMA 1-15P Electrical Plug: As used in this disclosure, the NEMA 1-15P Electrical Plug is a plug that is designed to be inserted into a NEMA 5-15 Electrical Socket for the purpose of delivering electrical power to electrical devices. The NEMA 1-15P Electrical Plug is a 2 blade plug that is commonly found within residential and office environments within the United States.

NEMA 5-15P Electrical Plug: As used in this disclosure, the NEMA 5-15P Electrical Plug is a plug that is designed to be inserted into a NEMA 5-15 Electrical Socket for the purpose of delivering electrical power to electrical devices. The NEMA 5-15P Electrical Plug is a 3 blade plug that is commonly found within residential and office environments within the United States.

Pedestal: As used in this disclosure, a pedestal is an intermediary load bearing structure that that transfers a load path between a supporting surface and an object, structure, or load.

Personal Data Device: As used in this disclosure, a personal data device is a handheld logical device that is used for managing personal information and communication. Examples of personal data device include, but are not limited to, cellular phones, tablets, and smartphones.

Photovoltaic Cell: As used in this disclosure, a photovoltaic cell is an electrical device that directly converts light energy into electrical energy.

Plug: As used in this disclosure, a plug is an electrical termination that electrically connects a first electrical circuit to a second electrical circuit or a source of electricity. As used in this disclosure, a plug will have two or three metal pins.

Port: As used in this disclosure, a port is an electrical termination that is used to connect a first electrical circuit to a second external electrical circuit. In this disclosure, the port is designed to receive a plug.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder. See Truss Shell: As used in this disclosure, a shell is a structure that forms an outer covering intended to contain an object. Shells are often, but not necessarily, rigid or semi-rigid structures that are intended to protect the object contained within it.

Suction Cup: As used in this disclosure, a suction cup means an object or device that uses negative fluid pressure of air or water to adhere to nonporous surfaces by creating a partial vacuum.

Supporting Surface: As used in this disclosure, a supporting surface is a horizontal surface upon which an object is placed and to which the load path of the object is transferred. This disclosure assumes that an object placed on the supporting surface is in an orientation that is appropriate for the normal or anticipated use of the object.

Switch: As used in this disclosure, a switch is an electrical device that starts and stops the flow of electricity through an electric circuit by completing or interrupting an electric circuit. The act of completing or breaking the electrical circuit is called actuation. Completing or interrupting an electric circuit with a switch is often referred to as closing or opening a switch respectively. Completing or interrupting an electric circuit is also often referred to as making or breaking the circuit respectively.

USB: As used in this disclosure, USB is an acronym for Universal Serial Bus which is an industry standard that defines the cables, the connectors, the communication protocols and the distribution of power required for interconnections between electronic devices. The USB standard defines several connectors including, but not limited to, USB-A, USB-B, mini-USB, and micro USB connectors. A USB cable refers to a cable that: 1) is terminated with USB connectors; and, 2) that meets the data transmission standards of the USB standard.

Vehicle: As used in this disclosure, a vehicle is a motorized device used for transporting passengers, goods, or equipment. The term motorized vehicle refers to a vehicle can move under power provided by an electric motor or an internal combustion engine.

Vent: As used in this disclosure, a vent is an opening in a structure that allows for the flow of gas through the boundary of the structure.

Voltage Regulator: As used in this disclosure, a voltage regulator refers to an electrical circuit that takes unregulated voltage as its power input and provides a constant output voltage independent of variations to input power supply voltage or output, or load, current.

With respect to the above description, it is to be realized that the optimum dimensional relationship for the various components of the invention described above and in FIGS. 1 through 6 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. An electric circuit for a vehicle comprising:
a power circuit and a housing;
wherein the housing contains the power circuit;
wherein the electric circuit for a vehicle is an electrochemical device;
wherein the electric circuit for a vehicle stores chemical potential energy readily converts into electricity for use with an electric vehicle;
wherein the electric circuit for a vehicle forms a power reserve;
wherein the electric circuit for a vehicle recharges a device selected from the group consisting of: a) an electric vehicle; b) a personal data device; and, c) the combination of the electric vehicle and the personal data device;
wherein the electric circuit for a vehicle independently replenishes the stored chemical potential energy after consumption;
wherein the power circuit comprises a plurality of photovoltaic cells, a battery circuit, and a power distribution circuit;
wherein the plurality of photovoltaic cells, the battery circuit, and the power distribution circuit are electrically interconnected;
wherein the battery circuit is further defined with a first positive terminal and a first negative terminal;
wherein the plurality of photovoltaic cells is further defined with a second positive terminal and a second negative terminal;
wherein the plurality of photovoltaic cells reverses the polarity of the battery circuit;
wherein a diode installs between the battery circuit and the plurality of photovoltaic cells such that electricity will not flow from the first positive terminal of the battery circuit into the second positive terminal of the plurality of photovoltaic cells.

2. The electric circuit for a vehicle according to claim 1 wherein the housing is a triangular prism structure;
wherein the housing is a casing.

3. The electric circuit for a vehicle according to claim 2 wherein the power circuit stores chemical potential energy;
wherein the power circuit converts the stored chemical potential energy into electrical energy;
wherein the power circuit distributes the electrical energy to a device selected from the group consisting of an electric vehicle and a personal data device;
wherein the power circuit converts light into electrical energy that is used to recharge the chemical potential energy stored within the power circuit;
wherein the power circuit further monitors the level of stored chemical potential energy.

4. The electric circuit for a vehicle according to claim 3 wherein the housing comprises a shell, a plurality of battery chambers, a plurality of footings, and a plurality of vents;
wherein the plurality of footings, and the plurality of vents attach to the shell;
wherein the plurality of battery chambers are contained within the shell.

5. The electric circuit for a vehicle according to claim 4 wherein the shell forms the exterior surfaces of the housing;
wherein the shell forms the shape of a triangular prism;
wherein each of the plurality of battery chambers is a cylindrical negative space formed within the interior of the shell.

6. The electric circuit for a vehicle according to claim 5 wherein each of the plurality of footings is a footing;
wherein the plurality of footings mount on the region of the lateral face of the shell that is proximal to the supporting surface that receives the shell;

wherein each of the plurality of vents is an aperture formed through the lateral face of the shell.

7. The electric circuit for a vehicle according to claim 6 wherein the battery circuit stores the chemical potential energy.

8. The electric circuit for a vehicle according to claim 7
wherein the plurality of photovoltaic cells is a collection of individual photovoltaic cells;
wherein each of the plurality of photovoltaic cells are electrically connected to form a bank;
wherein the plurality of photovoltaic cells mount on the lateral face of the shell;
wherein the plurality of photovoltaic cells feeds the generated electrical energy into the battery circuit.

9. The electric circuit for a vehicle according to claim 8
wherein the battery circuit further comprises a plurality of individual battery cells, a plurality of series circuits, and a plurality of parallel circuits;
wherein the plurality of individual battery cells, the plurality of series circuits, and the plurality of parallel circuits are electrically interconnected;
wherein the plurality of parallel circuits forms the first positive terminal and the first negative terminal.

10. The electric circuit for a vehicle according to claim 9
wherein each of the plurality of individual battery cells is a chemical device;
wherein each of the plurality of individual battery cells are identical;
wherein the plurality of individual battery cells stores chemical potential energy;
wherein the process that generates the chemical potential energy is reversible such that each of the plurality of individual battery cells is rechargeable.

11. The electric circuit for a vehicle according to claim 10
wherein a subset of individual batteries selected from the plurality of individual battery cells are electrically connected to form a series circuit selected from the plurality of series circuits;
wherein the subset of individual batteries electrically connect in series such that the voltage across the series circuit associated with the subset of individual batteries equals the sum of the voltage across each individual battery contained within the subset of individual batteries.

12. The electric circuit for a vehicle according to claim 11 wherein each individual battery contained within the plurality of individual battery cells are assigned to a series circuit selected from the plurality of series circuits.

13. The electric circuit for a vehicle according to claim 12 wherein the number of individual batteries contained within each series circuit selected from the plurality of series circuits is identical.

14. The electric circuit for a vehicle according to claim 13 wherein each of the plurality of series circuits are electrically connected in parallel to form the plurality of parallel circuits.

15. The electric circuit for a vehicle according to claim 14
wherein the plurality of parallel circuits further comprises a meter and a display;
wherein the meter is an electrical instrument;
wherein the meter electrically connects in parallel across the plurality of parallel circuits;
wherein the meter monitors the level of chemical potential energy contained within the plurality of parallel circuits;
wherein the meter indicates the measured level of chemical potential energy on the display.

16. The electric circuit for a vehicle according to claim 15
wherein the power distribution circuit further comprises a master switch, an EV cable, and an auxiliary power distribution;
wherein the master switch is an electrical switch;
wherein the master switch forms a series circuit between the battery circuit and the power distribution circuit;
wherein the master switch is a maintained switch;
wherein the EV cable is an electric cable that transfers electrical energy from the battery circuit to the power system of an electric vehicle;
wherein the EV cable is a commercially available product;
wherein the auxiliary power distribution further comprises a voltage regulator and a plurality of incidental ports;
wherein the voltage regulator is an electrical circuit;
wherein the voltage regulator is a circuit that changes the voltage provided by the plurality of parallel circuits;
wherein each of the plurality of incidental ports distributes electrical energy at the changed voltage.

17. The electric circuit for a vehicle according to claim 16
wherein the plurality of photovoltaic cells further comprises the diode and a fan;
wherein the fan is a mechanical device;
wherein the fan pumps air through the shell;
wherein the fan is configured to operate whenever the plurality of photovoltaic cells are generating electrical energy;
wherein the diode electrically connects in series between the plurality of photovoltaic cells and the battery circuit.

18. The electric circuit for a vehicle according to claim 17
wherein there is a one to one correspondence between the plurality of battery chambers and the plurality of series circuits;
wherein each of the plurality of battery chambers contains a series circuit selected from the plurality of series circuits;
wherein each of the plurality of footings are hinged structures;
wherein the plurality of vents are positioned on the same region of the shell as the plurality of footings.

\* \* \* \* \*